Patented Mar. 8, 1927.

1,620,342

UNITED STATES PATENT OFFICE.

ALONZO L. GIBBS AND JOSEPH A. GILL, OF TULSA, OKLAHOMA.

COMPOSITION FOR TREATING INNER TUBES.

No Drawing.   Application filed April 23, 1925. Serial No. 25,426.

This invention appertains to a novel composition for use in connection with pneumatic tires and the primary object of the invention is to provide a composition, which can be readily applied to the inner tube of a tire and which will act to preserve the rubber from which the tire is made and to stop punctures in the tube as the same occur and prevent leakage of air.
Another object of the invention is to provide a novel composition for this purpose which can be readily placed in the inner tubes and which will effectively seal all punctures as the same may occur, without attention of the driver of the automobile.

A further object of the invention is the provision of a composition for eliminating punctures in the inner tubes of automobile tires, which will be easy to prepare and one which can be placed on the market at a reasonable cost.

The composition preferably consists of mica (silver or white), specially prepared by grinding same up, cork (finely ground) or shredded, graphite flake (non-frictional), chloride of sodium (fine), fibre such as asbestos or ground wood, powdered slippery elm bark, and aqua ammonia, (16 degrees Baumé).
In preparing the composition it is preferred to use the ingredients in the following proportions: Mica, 48 oz.; cork, 16oz.; graphite, 12 oz.; chloride of sodium, 32 oz.; fibre, 20 oz.; slippery elm bark, 18.5 oz.;
aqua ammonia, 25.6 fl. oz.

The mica acts in the composition as a plugger and assists in forming a coating or lining over the interior surface of the inner tube and aids in warding off oxidation, which is found to deteriorate rubber.

The cork is used in the composition also as a plugging agent and it mingles with the other ingredients and assists in holding them in suspension in their relation to each other and prevents them from settling or packing.

The graphite also acts to aid the plugging or sealing of the puncture and clings to the particles of cork and thereby increases its gravity and causes it to more thoroughly mingle with the other components. It also helps the formation of the coating or lining for the interior surface of the tube. The graphite also prevents oxidation and is an assisting agency in the insertion of the composition into the tube. That is to say, when the graphite is placed in the inner tube, a sufficient quantity of it will adhere to the rubber whereby to form a coating sufficient to prevent the oxygen that is in the air which is placed in the inner tube from coming in contact with the rubber.

The chloride of sodium acts as an antifreezer and preserves the composition.

The fiber also acts as a plugging agent in the composition and prevents the constituent parts settling or becoming packed.

The powdered slippery elm bark is an agency which enables the easy filling of the composition into the inner tubes, causing it to enter the inner tubes without resistance or friction. It also contributes as an agent to bind and hold the other ingredients in proper relation to each other in suspension and as a pasty fluid. The bark also prevents the liquor from separating from the other components of the composition. Of course, it is to be understood that any other binder which may be found to be as desirable as the powdered slippery elm bark may be substituted therefor.

The aqua-ammonia is the fluid part of the composition and acts as a vehicle therefor, and tends to preserve the rubber and prevents the freezing of the composition.

The ingredients in the proportions stated are thoroughly mixed together, the dry ingredients being preferably mixed first, after which the aqua ammonia is poured therein. This aqua ammonia brings the ingredients to a pasty form and reduces the entire composition to a relative batter consistency.

After all the ingredients have been combined, the same is placed for marketing in collapsible tubes and it is obvious that the composition can be readily introduced into the pneumatic tube of the tires through the use of the collapsible tube.

The ingredients when properly compounded blend themselves into a pasty fluid which is easily injected into the interior of the inner tube which is full of air and readily moves from one part of the tube to another. Immediately upon the happening of the puncture the composition flows in and fills up the puncture, effectively sealing the hole and thus eliminating the puncture and preventing the escape of air automatically.

The composition is able to withstand heat without deteriorating and will only freeze at twenty one degrees below zero Farenheit.

Changes in details may be made without departing from the spirit or scope of this invention, but:—

What we claim as new is:

1. A composition for treating inner tubes comprising ground mica, shredded cork, non-frictional graphite, fine sodium of chloride, wood fibre, ground slippery elm bark, and aqua ammonia.

2. A composition for treating inner tubes comprising ground mica forty eight ounces, shredded cork sixteen ounces, non-frictional flake graphite twelve ounces, fine chloride of sodium thirty two ounces, ground fibre twenty ounces, ground slippery elm bark eighteen and five-tenths ounces, and aqua ammonia, sixteen degrees Baumé twenty five and six tenths fluid ounces.

In testimony whereof we affix our signatures.

ALONZO L. GIBBS.
JOSEPH A. GILL.